United States Patent Office 2,960,839
Patented Nov. 22, 1960

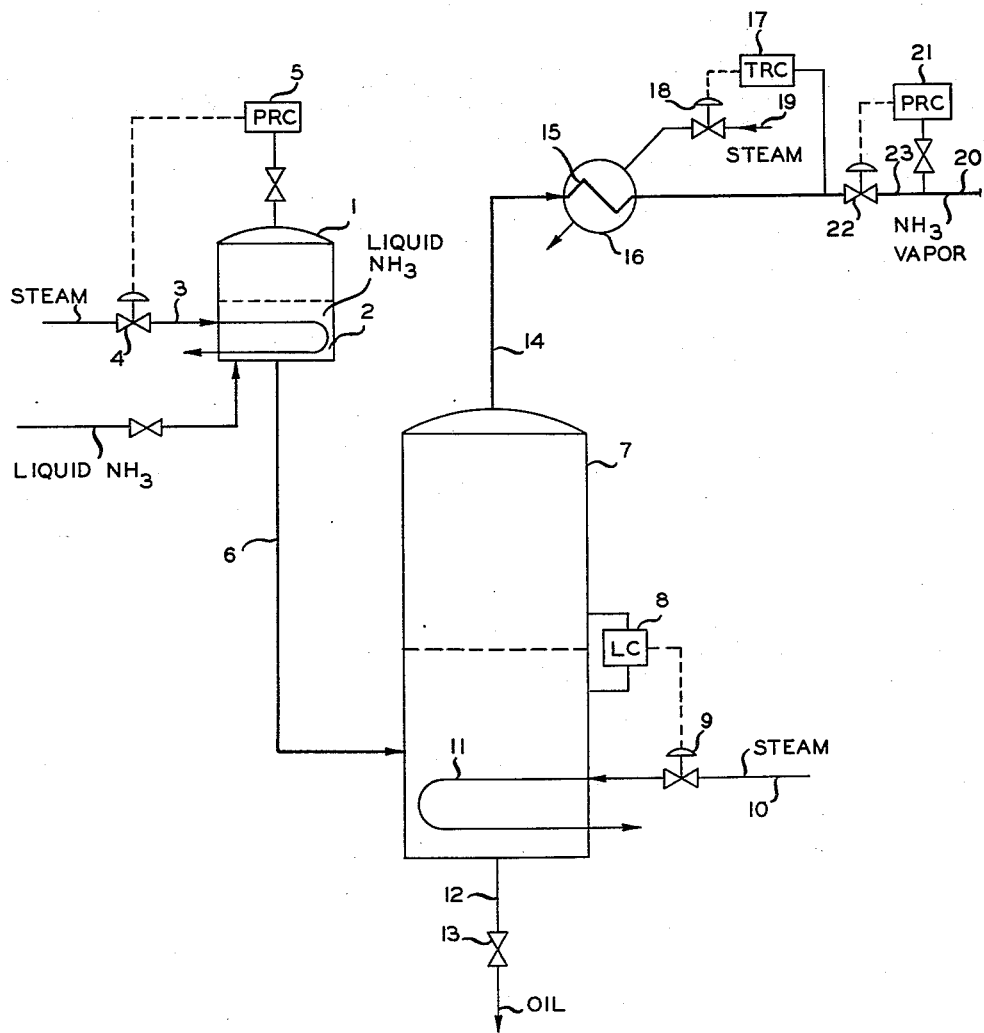

2,960,839
TRANSFORMING LIQUID TO A GAS OR VAPOR

William Franklin Hoag, Bartlesville, Okla., assignor to Phillips Petroleum Company, a corporation of Delaware Filed Sept. 14, 1959, Ser. No. 839,940

7 Claims. (Cl. 62—52)

This invention relates to the transforming of a liquid to a vapor or gas. In one of its aspects, the invention relates to a method of transforming a liquid to a vapor or gas. In another of its aspects, the invention relates to an apparatus for transforming a liquid to a gas or vapor. In a more specific aspect of the invention, it relates to the evaporation of a liquefied gas such as anhydrous ammonia. In one of its aspects, the invention relates to a method wherein liquid ammonia is maintained at a constant pressure by heating the same in a heating zone responsive to the pressure of the vapors therein, then removing the heated ammonia from said heating zone to another zone, in open communication with said heating zone, in which a constant liquid level of ammonia is maintained by supplying heat to said another zone responsive to said liquid level and from which another zone vapors are removed, as desired, to a third zone wherein the vapors are heated to a constant temperature still while maintaining a constant pressure on said vapors.

In the evaporation of liquid, for example, as in the transformation of a liquefied gas or vapor to a gaseous or vaporous state, it is desirable to be able to convert from a liquid to the gaseous or vaporous state without, however, permitting impurities in the liquefied gas or vapor or in the liquid sought to be gasified or vaporized to enter the gaseous or vaporous stream which will be utilized immediately for some reaction or other purpose. In the transformation of anhydrous ammonia liquid to vaporous ammonia as in the production of nitric acid from ammonia, it is desirable that oil contained in the ammonia be not evaporated. It is also desirable to have a system of controls for evaporating the ammonia at substantially the same rate as it is used. This is important, not only in connection with the making of nitric acid, but also in the production of aqueous ammonium nitrate solutions and, indeed, in other uses of ammonia. It is known that ammonia is shipped as a liquefied gas and that at the place of utilization, its evaporation can be a problem. Also, ammonia is often transported as a liquid from one place in a plant where it may be made to another. Here, too, its evaporation or gasification can present quite a problem.

It will be obvious to one skilled in the art in possession of this disclosure that the invention therein described is one of physical character and, therefore, possessing ready application to various transformations of liquids to gases or vapors and is, therefore, not to be limited necessarily to anhydrous ammonia for which it is particularly suited and now preferred.

It is an object of this invention to provide a method for transforming a liquid to a gas or vapor. It is a further object of this invention to provide an apparatus for transforming a liquid to a gas or vapor. It is a further object of the invention to provide method and apparatus for obtaining gas or vapor from a liquid state thereof at a predetermined temperature and pressure and at a rate at which the gas or vapor is being utilized. It is a further object of the invention to provide method and apparatus for transforming a liquid to a gas or vapor to obtain the same at a predetermined temperature and pressure and at a rate as utilized without being contaminated by vapors or entrained particles of impurities which may be in the liquid prior to evaporation.

Other aspects, objects and the several advantages of the invention are apparent from a study of the disclosure, drawing and the appended claims.

Since the invention is now preferred for the evaporation of liquid ammonia, there will now be described in connection with the drawing a preferred form of the method as it is conducted in a prefererd form of the apparatus.

Referring now to the drawing, 1 is a liquid ammonia preheating tank in which is maintained a body of liquid ammonia 2. The ammonia in tank 1 is heated by steam coil 3, flow of steam to which is controlled by valve 4, which is responsive to pressure-recorder-controller 5 which records the pressure in tank 1. Preheated liquid ammonia is passed by way of pipe 6 to a body thereof in the bottom of liquid level control tank 7. The liquid level control in tank 7 is composed of liquid level controller 8 and valve 9 on steam pipe 10, which feeds steam to coil 11 providing heat to the liquid ammonia in tank 7. Any oil which concentrates at the foot of tank 7 is periodically, or, if desired, continuously removed by way of pipe 12, controlled by valve 13. It will be noted that vapors are formed in tank 7 whenever the liquid level in tank 7 tends to rise since more steam will be added by liquid level controller 8 by way of valve 9 and pipe 10 to coil 11 in an effort to bring the rising level back to normal. Vapors are removed from tank 7 by way of pipe 14 and passed through coil 15 located in heat exchanger 16. The effluent from heat exchanger 16 is controlled by temperature-recorder-controller 17 which controls valve 18 on steam pipe 19 leading to coil 15. The pressure of the effluent which is removed by way of pipe 20 is controlled by pressure regulator controller 21 which controls valve 22 in pipe 20 responsive to the pressure in pipe 20 at point 23.

Whenever the utilization of the ammonia by way of pipe 20 is insufficient for some reason to use all the vapor tending to come into pipe 14 from tank 7, the pressure in tank 7 will tend to build up, thereby forcing the level in tank 7 downwardly and causing a reverse flow of the liquid ammonia from tank 7 through pipe 6 back to container 1.

In operation, the temperature and pressure in container 1 usually will be such that enough liquid ammonia vaporizes to permit the control of pressure responsive to temperature described. The temperature in this tank usually will be in the approximate range of 92 to 101° F. and the pressure will be usually in the approximate range of 170 to 200 p.s.i.g. The temperature in tank 7 usually will be the same as in container 1. The final temperature of the ammonia vapors can be varied considerably, depending upon the utilization as in the preparation of nitric acid. When used for the preparation of nitric acid, the temperature of the ammonia usually will be in the range 125 to 170° F. A pressure in pipe 20 in the approximate range of 150–180 p.s.i.g. will be employed usually.

Example

The following are informative relative to a specific operation of the invention just described.

Flow rate (line 6):
    Ammonia _____gal./hr__ 1500
    Oil _____gal./day__ 0.1
Oil removed (line 12) _____gal./day__ 0.1
1500 gal. ammonia/hr. produced (line 20).

|  | Temperature, ° F. | Pressure, p s.i.g. |
|---|---|---|
| Container 1 | 96–98 | 185–190 |
| Container 7 | 96–98 | 185–190 |
| After heater 16 and before valve 22 | 145–150 | 185–190 |
| Line 20 after valve 22 | 145–150 | 165–170 |

While described relative to the handling of ammonia, the invention, being of a physical character, can be readily adapted by one versed in the art to handle other liquids which are to be vaporized. Hydrocarbons which are to be vaporized, for example, hexane, pentane, and the like, or hydrocarbons which are normally gaseous but which are handled as liquid feeds to the system, e.g., ethane, propane, butane, can also be handled. Other materials are readily visualized.

Reasonable variation and modification are possible within the scope of the foregoing disclosure, the drawing and the appended claims to the invention, the essence of which is that there have been provided method and means for the stage-wise evaporation of a liquid to a gas, for example, the transformation of liquefied ammonia to gaseous ammonia, wherein in a first zone or container the liquefied material is maintained at a predetermined pressure by heating the same responsive to the pressure thereof, the heated material is passed to a second zone wherein the liquid level thereof is maintained by evaporating more or less of the material by heating the same more or less responsive to a desired liquid level therein, in a third zone, vapors obtained from the second zone are heated to a final desired temperature to obtain a vapor or gas stream at a desired temperature and pressure, substantially as set forth and described herein.

I claim:

1. A method of evaporating a liquefied gas and feeding the same at a predetermined temperature and at a predetermined pressure which comprises in a first zone maintaining a body of liquid or gas at a predetermined pressure by heating the same responsive to its pressure in said first zone, passing heated liquid gas from said first zone to a second zone, in said second zone, maintaining the liquid level of the liquid gas by heating the liquid gas responsive to change in said level by adding heat to evaporate more liquid gas when the level tends to rise and vice versa, removing vapors from said second zone and passing removed vapors to a third zone, in said third zone, heating said vapors to a predetermined temperature while maintaining a predetermined pressure on the vapors in said zone, and obtaining and removing from said zone vapors at said last-mentioned temperature and said last-mentioned pressure.

2. A method of evaporating ammonia and feeding the same at a predetermined temperature and at a predetermined pressure which comprises in a first zone maintaining a body of liquid ammonia at a predetermined pressure by heating the same responsive to its pressure in said first zone, passing ammonia from said first zone to a second zone, in said second zone, maintaining the liquid level of the ammonia by heating the ammonia responsive to change in said level by adding heat to evaporate more ammonia when the level tends to rise and vice versa, removing vapors from said second zone, and passing removed vapors to a third zone, in said third zone, heating said vapors to a predetermined temperature while maintaining a predetermined pressure on the vapors in said zone and obtaining and removing from said zone vapors of ammonia at said last-mentioned temperature and at said last-mentioned pressure.

3. A method according to claim 2 wherein the pressure in the first zone is in the range 170 to 200 pounds per square inch gage, the temperature in said zone varies in the range of 92 to 101° F.; the temperature in the second zone is in the range 92 to 101° F.; the temperature in the third zone is in the range 130 to 170° F. and the pressure maintained on the vapors in the third zone is in the range 170 to 200 pounds per square inch gage.

4. A method of evaporating hydrocarbon and feeding the same at a predetermined temperature and at a predetermined pressure which comprises in a first zone maintaining a body of liquid hydrocarbon at a predetermined pressure by heating the same responsive to its pressure in said first zone, passing hydorcarbon from said first zone to a second zone, in said second zone, maintaining the liquid level of the hydrocarbon by heating the hydrocarbon responsive to change in said level by adding heat to evaporate more hydrocarbon when the level tends to rise and vice versa, removing vapors from said second zone, and passing removed vapors to a third zone, in said third zone, heating said vapors to a predetermined temperature while maintaining a predetermined pressure on the vapors in said zone and obtaining and removing from said zone vapors of hydrocarbon at said last-mentioned temperature and at said last-mentioned pressure.

5. A method of evaporating a liquid and feeding the same at a predetermined temperature and at a predetermined pressure which comprises in a first zone maintaining a body of liquid at a predetermined pressure by heating the same responsive to its pressure in said first zone, passing the liquid from said first zone to a second zone, in said second zone, maintaining the level of the liquid by heating the liquid responsive to change in said level by adding heat to evaporate more liquid when the level tends to rise and vice versa, removing vapors from said second zone, and passing removed vapors to a third zone, in said third zone, heating said vapors to a predetermined temperature while maintaining a predetermined pressure on the vapors in said zone and obtaining and removing from said zone vapors of the liquid at said last-mentioned temperature and at said last-mentioned pressure.

6. A method of evaporating a liquefied gas and obtaining the same at a predetermined temperature and at a predetermined pressure which comprises maintaining a body of said liquefied gas in a closed first zone, in said first zone, heating said liquefied gas responsive to the pressure thereof in said zone, removing from said zone heated liquefied gas and passing the same to a second closed zone, in said second closed zone, heating said liquefied gas responsive to the liquid level of said liquefied gas therein, supplying more heat when the level tends to rise and diminishing the rate of heating when the level tends to fall, removing from said zone only vapors of said liquefied gas as the sole stream removed from said zone, passing said removed stream to a third closed heating zone, therein heating said vapors further responsive to the temperature thereof to obtain the said desired temperature, obtaining effluent from the last zone while maintaining on said effluent a pressure which is said predetermined pressure.

7. An apparatus for evaporating a liquid such as liquefied ammonia gas which comprises in combination a first means adapted to contain liquefied ammonia, said first means having means in cooperation therewith to heat liquid amomnia therein responsive to the pressure of said liquid ammonia therein, a second means to contain liquefied ammonia, means to pass liquefied ammonia from said first means to said second means, means upon said second means to control liquid level of ammonia therein by adjusting its temperature responsive to liquid level of ammonia therein, a third means adapted to heat ammonia vapors, means to transport ammonia vapors from said second means to said third means, means upon said third means to heat ammonia vapor therein responsive to temperature of ammonia vapor leaving said third means, and means in communication with said third means for maintaining a predetermined pressure upon the ammonia obtained from said third means.

References Cited in the file of this patent

UNITED STATES PATENTS

| | | |
|---|---|---|
| 2,255,747 | Jones | Sept. 16, 1941 |
| 2,464,835 | Thayer et al. | Mar. 22, 1949 |
| 2,516,218 | Kerr | July 25, 1950 |
| 2,522,026 | Evans | Sept. 12, 1950 |